US011190928B2

United States Patent
Chandramouli et al.

(10) Patent No.: US 11,190,928 B2
(45) Date of Patent: Nov. 30, 2021

(54) DATA STORAGE FUNCTION SELECTION

(71) Applicant: NOKIA TECHNOLOGIES OY, Espoo (FI)

(72) Inventors: Devaki Chandramouli, Plano, TX (US); Bruno Landais, Pleumeur-Bodou (FR); Laurent Thiebaut, Antony (FR); Peter Leis, Penzberg (DE); Thomas Theimer, Baierbrunn (DE); Tuomas Niemela, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/471,093

(22) PCT Filed: Dec. 19, 2016

(86) PCT No.: PCT/US2016/067484
§ 371 (c)(1),
(2) Date: Jun. 19, 2019

(87) PCT Pub. No.: WO2018/118001
PCT Pub. Date: Jun. 28, 2018

(65) Prior Publication Data
US 2020/0120474 A1    Apr. 16, 2020

(51) Int. Cl.
*H04W 8/02*    (2009.01)
*H04L 29/08*    (2006.01)

(52) U.S. Cl.
CPC ........... *H04W 8/02* (2013.01); *H04L 67/10* (2013.01)

(58) Field of Classification Search
CPC ....... H04W 4/029; H04W 4/21; H04W 4/024; H04W 4/02; H04W 4/04; H04W 4/06; H04W 4/24; H04W 4/30; H04W 4/50; H04W 8/02; H04W 28/08; H04L 12/66; H04L 67/10

See application file for complete search history.

(56) References Cited

U.S. PATENT DOCUMENTS

| 6,047,313 A * | 4/2000 | Hashimoto | ......... H04L 67/2842 709/203 |
| 10,154,034 B2 * | 12/2018 | Grube | ................. G06F 11/0763 |
| 2004/0248571 A1 | 12/2004 | Robinson et al. | |
| 2008/0232352 A1 | 9/2008 | Terrill et al. | |

(Continued)

FOREIGN PATENT DOCUMENTS

EP    2873261 A1    5/2015

OTHER PUBLICATIONS

International Search Report and Written Opinion dated Mar. 9, 2017 corresponding to International Patent Application No. PCT/US2016/067484.

(Continued)

*Primary Examiner* — Jean A Gelin
(74) *Attorney, Agent, or Firm* — Squire Patton Boggs (US) LLP (57) ABSTRACT

Systems, methods, apparatuses, and computer program products for data storage (DS) function selection are provided. One method includes obtaining, from a network node, an address of a DS function that contains user equipment (UE) context information for at least one UE. The method may further include accessing, by a client, the DS function to register for the UE context information.

16 Claims, 7 Drawing Sheets

(56) References Cited

U.S. PATENT DOCUMENTS

| | | | |
|---|---|---|---|
| 2011/0103374 A1 | 5/2011 | Lajoie et al. | |
| 2012/0209839 A1* | 8/2012 | Andrews | H04L 67/306 707/728 |
| 2012/0307801 A1 | 12/2012 | Olsson et al. | |
| 2013/0066771 A1* | 3/2013 | Ciurea | G06Q 30/0207 705/39 |
| 2013/0332362 A1* | 12/2013 | Ciurea | G07F 9/001 705/44 |
| 2014/0040134 A1* | 2/2014 | Ciurea | G06Q 20/383 705/44 |
| 2014/0280794 A1* | 9/2014 | Baca | H04W 4/33 709/220 |
| 2015/0271827 A1 | 9/2015 | Hamalainen et al. | |
| 2015/0312700 A1 | 10/2015 | Wang et al. | |
| 2015/0347519 A1* | 12/2015 | Hornkvist | G06F 16/9537 707/722 |
| 2015/0365860 A1 | 12/2015 | Yu et al. | |
| 2016/0360560 A1* | 12/2016 | Jiang | G06F 11/1438 |
| 2019/0037516 A1* | 1/2019 | Kim | H04W 60/005 |
| 2019/0068608 A1* | 2/2019 | Boland | G06F 16/252 |
| 2020/0045497 A1* | 2/2020 | Kang | H04M 1/72454 |
| 2020/0053802 A1* | 2/2020 | Li | H04L 41/5077 |

OTHER PUBLICATIONS

Extended European Search Report issued in corresponding European Patent Application No. 16 924 243.5, dated Jun. 29, 2020.
Anonymous: "3rd Generation Partnership Project; Technical Specification Group Services and System Aspects; Study on Architecture for Next Generation System (Release 14)", 3GPP Standard; Technical Report; 3GPP TR 23.799, 3rd Generation Partnership Project (3GPP); Mobile Competence Centre; 650, Route des Lucioles; F-06921 Sophia-Antipolis Cedex; France, vol. SA WG2, No. V14. 0.0, Dec. 16, 2016, pp. 1-527, XP051295448.
Communication pursuant to Article 94(3) EPC issued in corresponding European Patent Application No. 16924243.5, dated Sep. 2, 2021.

* cited by examiner

DATA STORAGE FUNCTION SELECTION

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to data storage function selection, for example, in 5G or NR systems.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. Narrowband IoT-LTE (NB-IoT) is envisioned to operate on 180/200 kHz channel. The deployment of NB-IoT may be in-band LTE, a guard band to LTE, UMTS or other system as well as stand-alone on a specific carrier.

SUMMARY

One embodiment is directed to a method, which includes obtaining, from a network node, an address of a data storage function, home subscriber server front end, or network exposure function that contains user equipment context information for at least one user equipment. The method may also include accessing, by a client, the data storage function, home subscriber server front end, or network exposure function to register for the user equipment context information.

Another embodiment is directed to an apparatus including at least one processor and at least one memory including computer program code. The at least one memory and the computer program code are configured, with the at least one processor, to cause the apparatus at least to obtain, from a network node, an address of a data storage function, home subscriber server front end, or network exposure function that contains user equipment context information for at least one user equipment, and access the data storage function, home subscriber server front end, or network exposure function to register for the user equipment context information.

Another embodiment is directed to an apparatus that includes obtaining means for obtaining, from a network node, an address of a data storage function, home subscriber server front end, or network exposure function that contains user equipment context information for at least one user equipment. The apparatus may also include accessing means for accessing the data storage function, home subscriber server front end, or network exposure function to register for the user equipment context information.

Another embodiment is directed to a computer program embodied on a non-transitory computer readable medium. The computer program is configured to control a processor to perform a process including obtaining, from a network node, an address of a data storage function, home subscriber server front end, or network exposure function that contains user equipment context information for at least one user equipment. The process may also include accessing the data storage function, home subscriber server front end, or network exposure function to register for the user equipment context information.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for data storage function selection, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

$5^{th}$ generation wireless systems (5G) refers to the next generation (NG) of radio systems and network architecture. 5G is expected to provide higher bitrates and coverage than current LTE systems. 5G is also expected to increase network expandability up to hundreds of thousands of connections. The signal technology of 5G is anticipated to be improved for greater coverage as well as spectral and signaling efficiency. 5G will deliver extreme broadband and ultra-robust, low latency connectivity and massive networking to support the Internet of Things (IoT). With IoT devices and machine-to-machine (M2M) communication becoming more widespread, 5G networks will need to meet the needs of lower power, low data rate, and long battery life.

In order to provide the ultra-robust, low latency connectivity and massive networking for supporting IoT devices and machine-to-machine (M2M) communication, 5G will provide massive broadband that delivers gigabytes of bandwidth in uplink and downlink per second on demand, critical machine-type communication (MTC) that allows for the immediate (i.e., with extreme low e2e latency), synchronous feedback that enables, for example, remote control of robots and cars, and massive MTC that connects billions of sensors and machines.

One of the biggest differences between LTE (i.e., 4G) and 5G design requirements is the diversity of use-cases that 5G networks must support as compared to LTE networks that are primarily designed for the single use-case of delivering high speed mobile broadband. 5G will not only be a 'new RAT family' but its architecture will expand to multiple dimensions by providing a common core for multiple radio technologies (cellular, Wi-Fi, fixed), multiple services (IoT, mobile broadband, low latency-high reliability) and multiple network and service operators.

It is widely expected that the Next Generation (NG) wireless systems will be virtualized. As a result, it is believed that RAN functions (cloud RAN) and core network functions will be running on top of a data center. It is also expected that the compute functions should be decoupled from the storage layer leveraging virtualization infrastructure. There is significant interest to support network functions that are completely stateless; however this will likely result in new problems or challenges that will need to be addressed. The data exposure solution leveraging data storage is proposed for standardization to 3GPP technical report (TR) 23.799 (solution 6.7.5). There are at least two issues that remain unresolved: 1) Determining how the consumer of UE context data can locate the correct logical data storage function that holds relevant UE context in order to subscribe and obtain certain UE context information; and 2) Determining how the consumer of UE context data can locate and register with the correct logical data storage/data storage function when the UE is roaming and/or in the home network, as well as 3) determining how the consumer of UE context data and producer of UE context data will interface with each other when the UE is roaming and/or in the home network. It is noted that the consumer of UE context data and the producer of UE context data are typically network nodes or functions.

In view of the above-noted issues, one approach is for the data storage function (DSF) that handles data for a UE to be selected based on international mobile subscriber identity (IMSI), so that the data producer and data consumer find the responsible DSF for a UE based on the IMSI. Furthermore, in this approach, it is assumed that the data is not re-homed upon UE relocation. However, this approach requires extensive configuration.

Certain embodiments provide methods for network functions or nodes to discover the appropriate data storage or data storage function in order to subscribe for UE context. Accordingly, an embodiment allows the network function or node to locate the data storage function where the UE context is stored. Thus, one embodiment is directed to storing a pointer to the data storage function (DSF) that stores the UE context within the home subscriber server (HSS) or subscriber data management function (SDM). If the UE has a serving network function, such as an access and mobility management function (AMF) assigned, then both the address for the AMF and DSF may be stored in the HSS/SDM. If the serving network function has been released, then at least the location of the DSF may be stored. This will allow other internal network functions to determine the location of the DSF in order to subscribe for UE related parameters both in case of roaming and non-roaming scenarios. In the present disclosure, a "client" may refer to the consumer and/or the producer of UE context data.

Figure 1A:
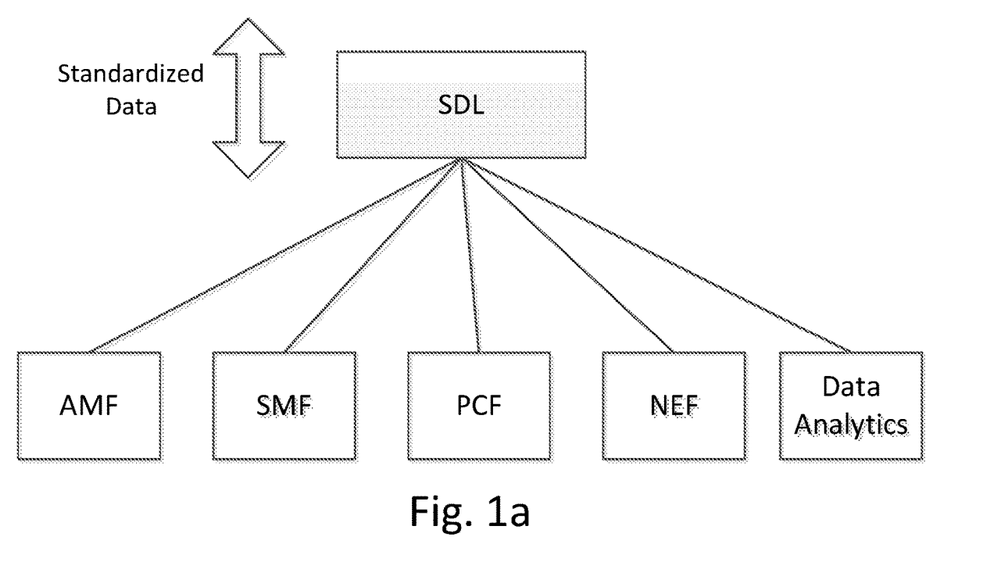
FIG. 1a illustrates an example of a system architecture for network capability exposure, according to an embodiment.
Figure 1B:
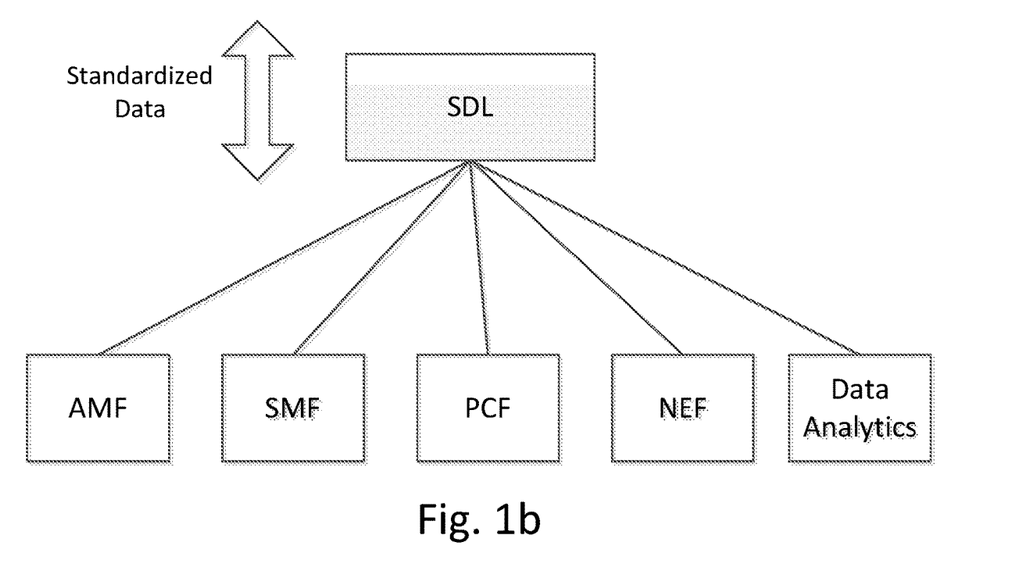
FIG. 1b illustrates an example of a system architecture for network capability exposure, according to an embodiment.

FIGS. 1a and 1b illustrate an example of a system architecture for network capability exposure, according to an embodiment. As illustrated in FIG. 1a, a shared data storage (SDSF) may be a central point of storage for all of the data used by network functions (NFs) or virtualized network functions (VNFs). As a result, the SDSF frees the NFs or VNFs from the need to manage their own data. This results in a more flexible, programmable and reliable network for 5G or NG systems, which is able to support ultra-robust, low latency connectivity and massive networking for the IoT.

Certain embodiments are directed to ways for the client to register with the data storage in a non-roaming scenario, for example. In an embodiment, the client is configured to obtain the necessary information from HSS/SDM to locate the data storage (DSF). In this embodiment, it may be assumed that UE-to-DSF association information is stored in the SDM. In addition, the AMF may notify the HSS/SDM of the updated DSF information upon relocation. According to an embodiment, the client may obtain the necessary information from the service discovery function (SDF) to locate the DSF. In this embodiment, it is assumed that {Storage service, DSF function} in order to discover the service, {UE-to-DSF association information} may be stored in the SDF. Similarly, the AMF may notify the HSS/SDM of the updated DSF information upon relocation.

Figure 2A:
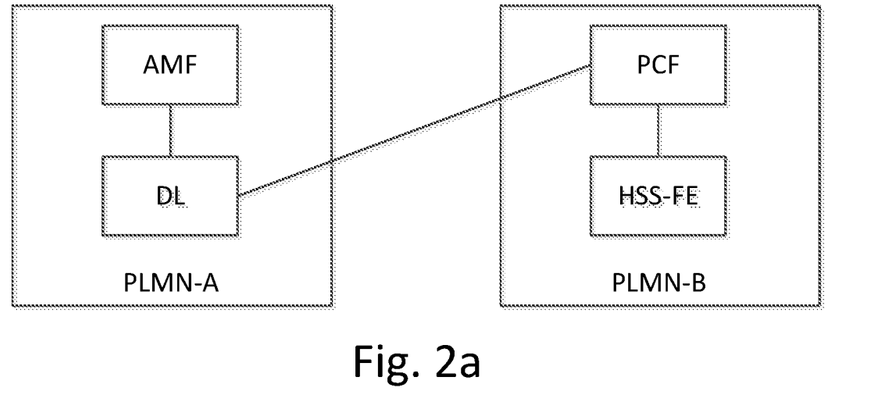
FIG. 2a illustrates an example of a roaming system architecture, according to an embodiment.
Figure 2B:
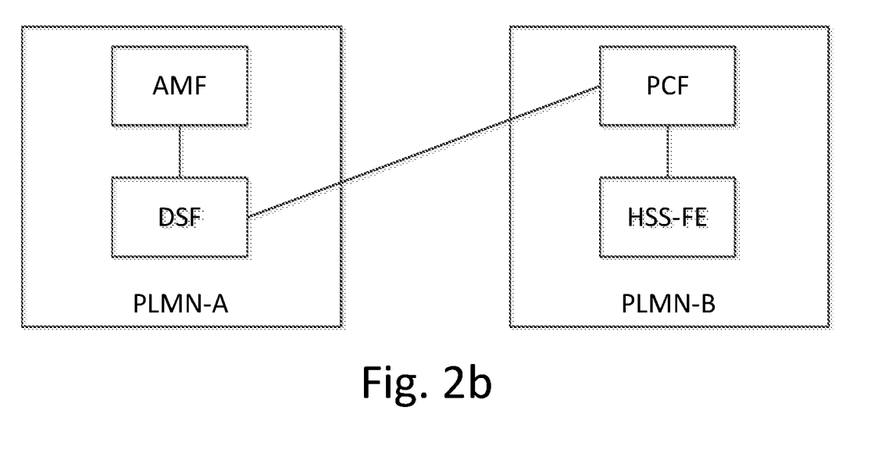
FIG. 2b illustrates an example of a roaming system architecture, according to another embodiment.

Other embodiments are directed to ways for the client to register with the data storage (DSF) in a roaming scenario. FIGS. 2a and 2b illustrate an example of a roaming system architecture, according to certain embodiments. In the example of FIGS. 2a and 2b, the policy control function (PCF) is the consumer of UE context data and the AMF is the producer of UE context data. According to an embodiment, the PCF may look up the HSS-front end (HSS-FE) (this could also be a standalone front end (FE) or network exposure function (NEF) to obtain the serving DSF information where the UE context resides. The PCF may register with the serving DSF (e.g., a visited public land mobile network (VPLMN)) for the necessary context information. Upon relocation of the UE, respective clients may be notified for subscription towards a new DSF function for re-registration. Alternatively, during relocation, a new DSF may obtain the registration information as part of a context transfer.

Figure 3A:
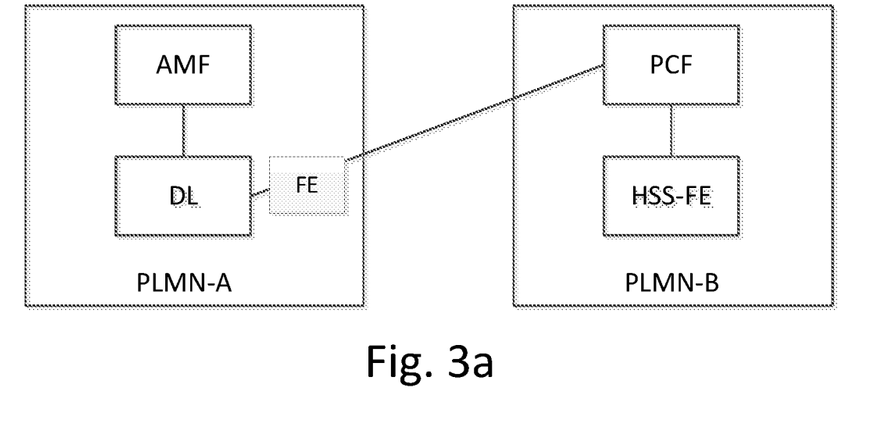
FIG. 3a illustrates another example of a roaming system architecture, according to an embodiment.
Figure 3B:
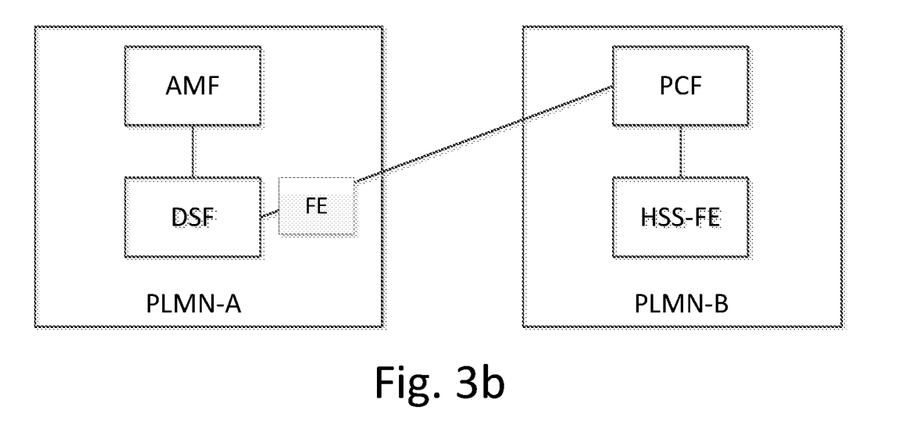
FIG. 3b illustrates another example of a roaming system architecture, according to an embodiment.

FIGS. 3a and 3b illustrate another example of a roaming system architecture, according to certain embodiments. In the example of FIGS. 3a and 3b, the policy control function (PCF) is the consumer of UE context data and the AMF is the producer of UE context data. In this embodiment, the PCF may look up the HSS-FE (this could also be a standalone front end (FE) or network exposure function (NEF)) to obtain the serving DSF information where the UE context resides. The PCF may register with the serving DSF (e.g., VPLMN) via FE for necessary context information. Upon relocation of the UE, respective clients may be notified for subscription towards the new DSF function/FE for re-registration. Alternatively, during relocation, the new DSF may obtain the registration information as part of context transfer.

Figure 4A:
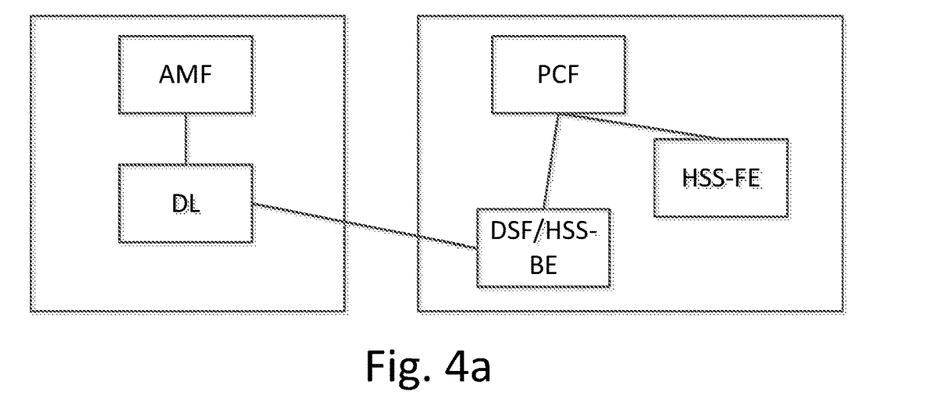
FIG. 4a illustrates another example of a roaming system architecture, according to an embodiment.
Figure 4B:
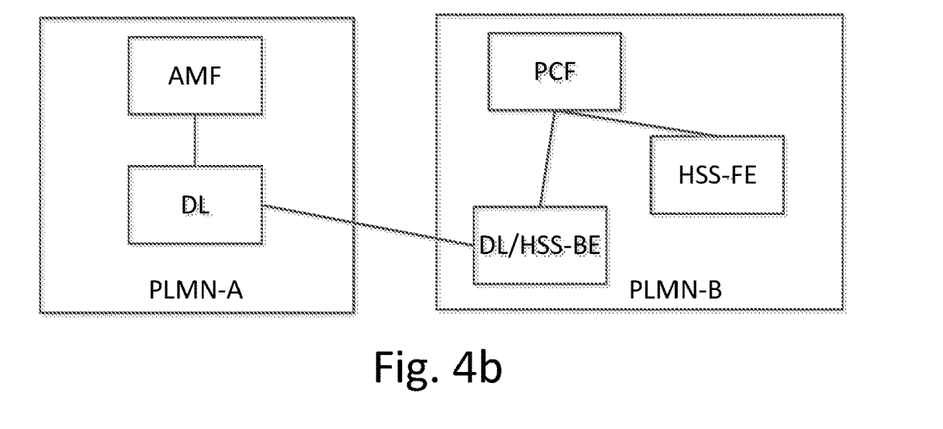
FIG. 4b illustrates another example of a roaming system architecture, according to another embodiment.
Figure 4C:
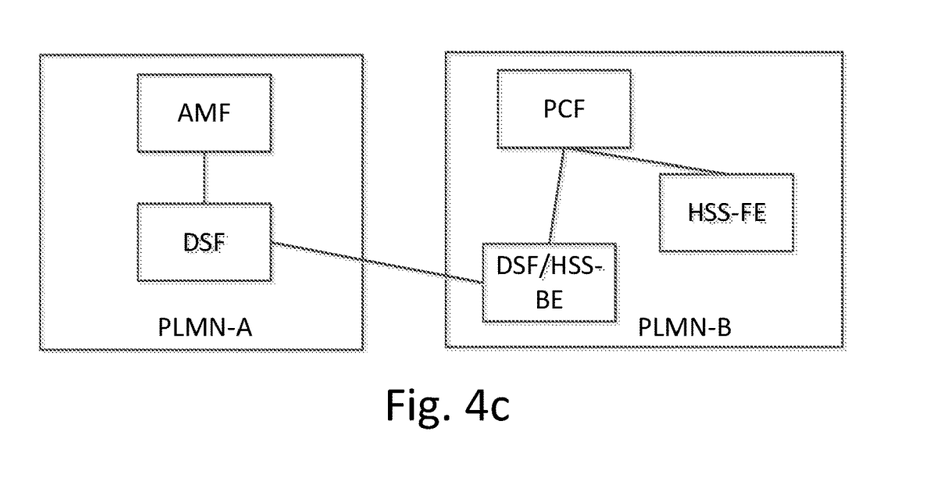
FIG. 4c illustrates another example of a roaming system architecture, according to another embodiment.

FIGS. 4a, 4b, and 4c illustrate other examples of a roaming system architecture, according to certain embodiments. In the example of FIGS. 4a, 4b, and 4c, the policy control function (PCF) may be the consumer of UE context data and the AMF may be the producer of UE context data. In this embodiment, the PCF may look up the HSS-FE to obtain the DSF information where the UE context resides. If the UE is roaming, the HSS-FE may return the location of DSF in the home public land mobile network (HPLMN) and the location of DSF in the VPLMN. According to an embodiment, the DSF in the HPLMN may use the serving DSF information to register for the appropriate UE context information. In this case, the DSF in the HPLMN acts as the consumer on behalf of network functions (NFs) in the HPLMN. Upon relocation, in an embodiment, only the DSF in the HPLMN is notified as it hides mobility from corresponding NFs in the HPLMN.

Figure 5A:
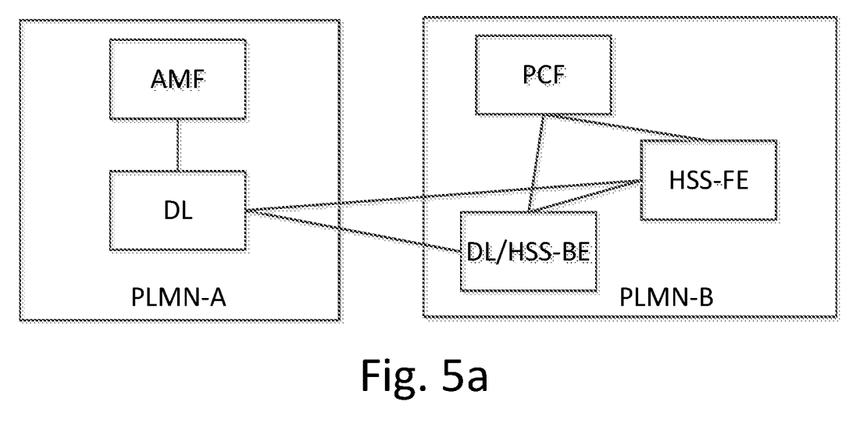
FIG. 5a illustrates another example of a roaming system architecture, according to an embodiment.
Figure 5B:
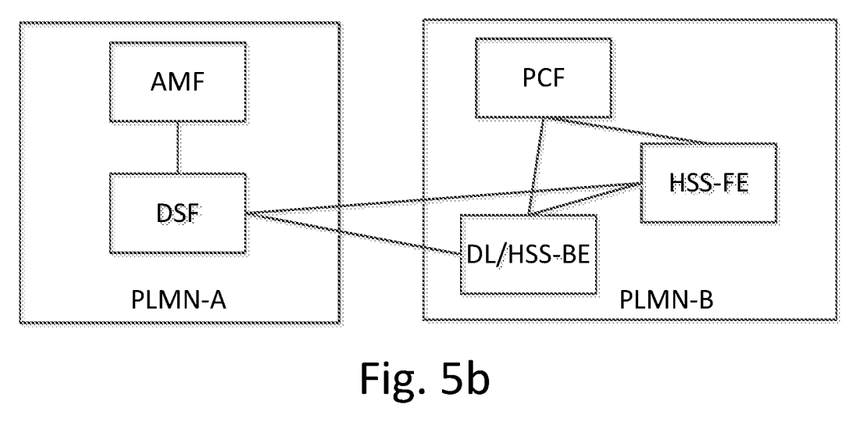
FIG. 5b illustrates another example of a roaming system architecture, according to an embodiment.

FIGS. 5a and 5b illustrate yet another example of a roaming system architecture, according to certain embodiments. In the example of FIGS. 5a and 5b, the policy control function (PCF) may be the consumer of UE context data and the AMF may be the producer of UE context data. In this embodiment, the PCF may look up the HSS-FE to obtain the DSF information where the UE context resides. If the UE is roaming, the HSS-FE may register with the DSF in the VPLMN. The DSF in the HPLMN may use the serving DSF information to register for the appropriate UE context information. In this case, the DSF in the HPLMN acts as the consumer on behalf of NFs in the HPLMN. In an embodiment, upon relocation, only the DSF in the HPLMN is notified as it hides mobility from corresponding NFs in the HPLMN.

Figure 6A:
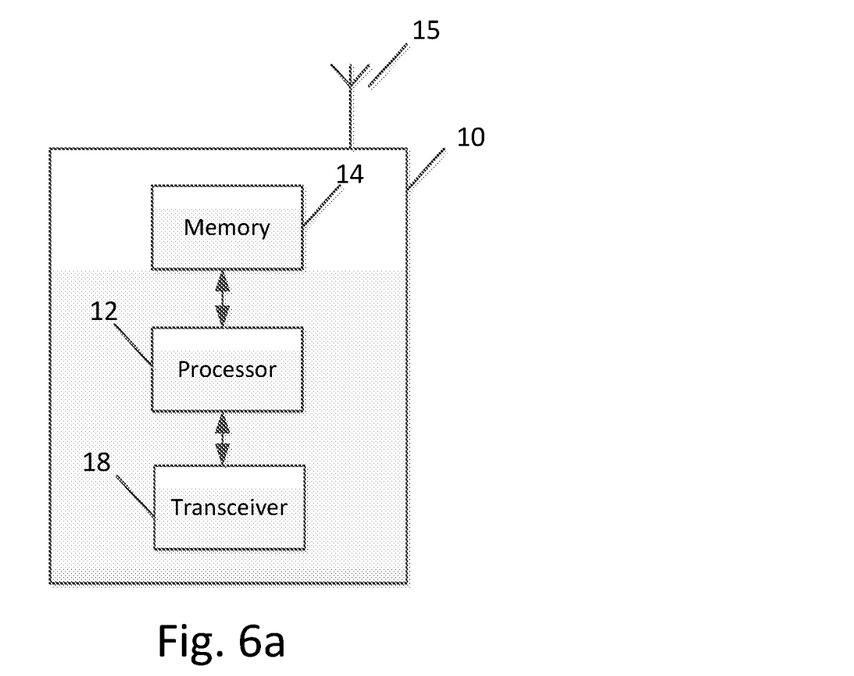
FIG. 6a illustrates a block diagram of an apparatus, according to one embodiment.

FIG. 6a illustrates an example of an apparatus 10 according to an embodiment. In an embodiment, apparatus 10 may be a node, host, or server in a communications network or serving such a network. For example, in certain embodiments, apparatus 10 may be a base station, a node B, an evolved node B, 5G node B or access point, or WLAN access point. In other embodiments, apparatus 10 may be a policy control function (PCF), access and mobility management function (AMF), session management function (SMF), subscriber data management function (SDM), mobility management entity (MME), subscription server or home subscription server (HSS) associated with a radio access network, such as a LTE network or 5G radio access technology. It should be noted that one of ordinary skill in the art would understand that apparatus 10 may include components or features not shown in FIG. 6a.

As illustrated in FIG. 6a, apparatus 10 may include a processor 12 for processing information and executing instructions or operations. Processor 12 may be any type of general or specific purpose processor. While a single processor 12 is shown in FIG. 6a, multiple processors may be utilized according to other embodiments. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 12, enable the apparatus 10 to perform tasks as described herein.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna (s) 15. The radio interfaces may correspond to a plurality of radio access technologies including one or more of LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node, server, network function or data analytics function, such as a producer or consumer of UE context information. For example, in some embodiments, apparatus 10 may be a PCF or AMF. According to certain embodiments, apparatus 10 may be controlled by memory 14 and processor 12 to perform the functions associated with embodiments described herein. In one embodiment, apparatus 10 may be controlled by memory 14 and processor 12 to obtain, from a network node (e.g., a HSS, HSS-FE, SDM or SDF), an address or location of a data storage function, home subscriber server front end (with data storage function as the backend), or network exposure function that contains UE context information for one or more UEs. Apparatus 10 may then be controlled by memory 14 and processor 12 to access the data storage function or home subscriber server front end or network exposure function to register for the user equipment context information. According to some embodiments, the data storage function may be a data storage function (DSF) or serving data storage where the UE context information resides.

In one embodiment, apparatus 10 may be controlled by memory 14 and processor 12 to look-up a HSS and/or HSS-FE to obtain the serving data storage information where the UE context information resides. In another embodiment, apparatus 10 may be controlled by memory 14 and processor 12 to look-up a network exposure function to obtain the serving data storage information where the UE context information resides. According to an embodiment, apparatus 10 may be controlled by memory 14 and processor 12 to register with the serving data storage for the UE context information. For example, in an embodiment, apparatus 10 may be controlled by memory 14 and processor 12 to register with the serving data storage via the FE for the UE context information. In one embodiment, the serving data storage may be a VPLMN.

According to an embodiment, when the UE is roaming, apparatus 10 may be controlled by memory 14 and processor 12 to receive the address of the data storage function in the HPLMN and the address of the data storage function in the VPLMN. In one embodiment, the data storage function in the HPLMN uses the serving data storage information to register for the UE context information. According to another embodiment, when the UE is roaming, apparatus 10 may be controlled by memory 14 and processor 12 to register with the data storage function in the VPLMN.

In certain embodiments, upon re-location of the UE(s), apparatus 10 may be controlled by memory 14 and processor 12 to receive a notification to subscribe to a new data storage function containing the UE context information. In another embodiment, upon re-location of the UE(s), a new data storage function obtains registration information of the apparatus 10 as a part of context transfer. In yet another embodiment, upon re-location of the UE(s), the data storage function in the HPLMN is notified of a new data storage function in the VPLMN.

Figure 6B:
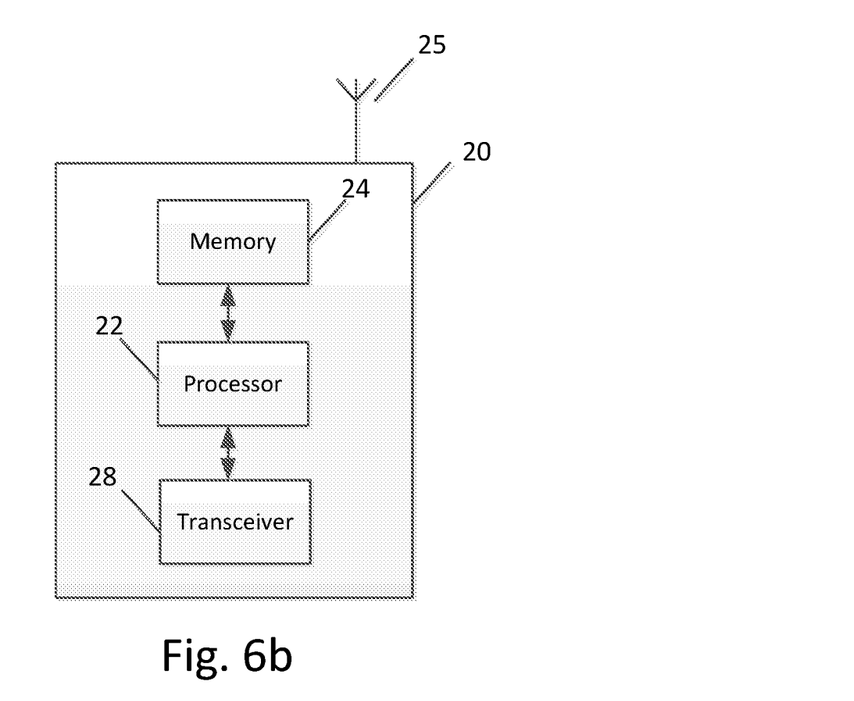
FIG. 6b illustrates a block diagram of an apparatus, according to another embodiment.

FIG. 6b illustrates an example of an apparatus 20 according to another embodiment. In an embodiment, apparatus 20 may be a server, node, host or element in a communications network or associated with such a network, such as a HSS, HSS-FE, SDM, or SDF, or other node.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as LTE, LTE-A, 5G, WLAN, WiFi, Bluetooth, NFC, and any other radio access technologies. It should be noted that one of ordinary skill in the art would understand that apparatus 20 may include components or features not shown in FIG. 6b.

As illustrated in FIG. 6b, apparatus 20 may include or be coupled to a processor 22 for processing information and executing instructions or operations. Processor 22 may be any type of general or specific purpose processor. While a single processor 22 is shown in FIG. 6b, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In some embodiments, apparatus 20 may also include or be coupled to one or more antennas 25 for receiving a downlink or signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of LTE, LTE-A, 5G, WLAN, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a HSS, HSS-FE, SDM, or SDF, for example. According to certain embodiments, apparatus 20 may be controlled by memory 24 and processor 22 to perform the functions associated with embodiments described herein. In one embodiment, apparatus 20 may be controlled by memory 24 and processor 22 to store an address or location of a data storage function or home subscriber server front end or network exposure function that contains UE context information for one or more UE(s). In an embodiment, apparatus 20 may be further controlled by memory 24 and processor 22 to store an address or location of a serving network function, such as an AMF. According to an embodiment, apparatus 20 may be further controlled by memory 24 and processor 22 to provide the address or location of the data storage function or home subscriber server front end or network exposure function upon request from a client, for example, in order to allow the client to determine the location of the data storage function/home subscriber server front end/network exposure function to subscribe for the UE context information.

According to an embodiment, when the UE is roaming, apparatus 20 may be controlled by memory 24 and processor 22 to provide, to the client, the address of the data storage function in the HPLMN and the address of the data storage function in the VPLMN. In certain embodiments, upon re-location of the UE(s), apparatus 20 may be controlled by memory 24 and processor 22 to provide, to the client, a notification to subscribe to a new data storage function containing the UE context information.

Figure 7A:
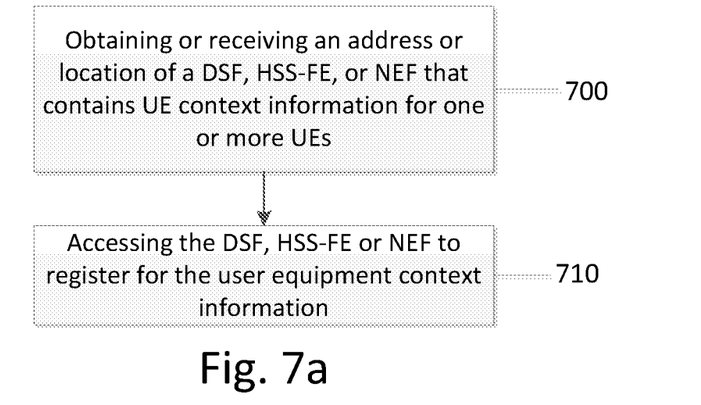
FIG. 7a illustrates an example of a flow diagram of a method, according to one embodiment.

FIG. 7a illustrates an example flow diagram of a method, according to one embodiment. In certain embodiments, the method of FIG. 7a may be performed by a network node, server, network function or data analytics function, such as a producer or consumer of UE context information. For example, in some embodiments, the method of FIG. 7a may be performed by a PCF or AMF. As illustrated in FIG. 7a, in one embodiment, the method may include, at 700, obtaining or receiving, from a network node (e.g., a HSS, HSS-FE, SDM or SDF), an address or location of a data storage function, home subscriber server front end (with data storage function as the backend), or network exposure function that contains UE context information for one or more UEs. The method may also include, at 710, accessing the data storage function to register for the user equipment context information. According to some embodiments, the data storage function may be a data storage function (DSF) or serving data storage where the UE context information resides.

In one embodiment, the obtaining step may include looking-up a HSS and/or HSS-FE to obtain the serving data storage information where the UE context information resides. In another embodiment, the obtaining step may include looking-up a network exposure function to obtain the serving data storage information where the UE context information resides. According to an embodiment, the accessing step may include registering with the serving data storage for the UE context information. For example, in an embodiment, the method may include registering with the serving data storage via the FE for the UE context information. In one embodiment, the serving data storage may be a VPLMN.

According to an embodiment, when the UE is roaming, the method may include receiving the address of the data storage function in the HPLMN and the address of the data storage function in the VPLMN. In one embodiment, the data storage function in the HPLMN uses the serving data storage information to register for the UE context information. According to another embodiment, when the UE is roaming, the accessing step may include registering with the data storage function in the VPLMN.

In certain embodiments, upon re-location of the UE(s), the method may further include receiving a notification to subscribe to a new data storage function containing the UE context information. In another embodiment, upon re-location of the UE(s), the method may include that a new data storage function obtains registration information of the producer/consumer of the UE context information (e.g., PCF or AMF) as a part of context transfer. In yet another embodiment, upon re-location of the UE(s), the data storage function in the HPLMN is notified of a new data storage function in the VPLMN.

Figure 7B:
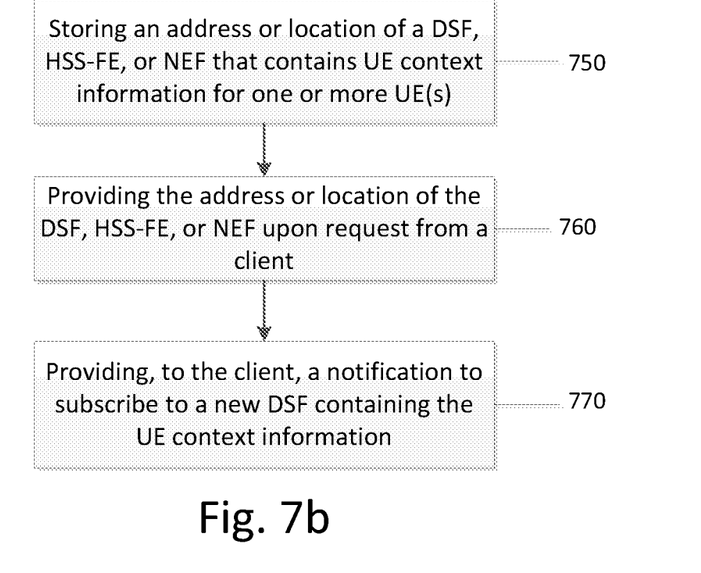
FIG. 7b illustrates an example of a flow diagram of a method, according to another embodiment.

FIG. 7b illustrates an example flow diagram of a method, according to another embodiment. In certain embodiments, the method of FIG. 7b may be performed by a network node or server, such as a HSS, HSS-FE, SDM, or SDF, for example. In one embodiment, the method may include, at 750, storing an address or location of a data storage function, home subscriber server front end, or network exposure function that contains UE context information for one or more UE(s). In an embodiment, the storing step may further include storing an address or location of a serving network function, such as an AMF. According to an embodiment, the method may further include, at 760, providing the address or location of the data storage function/home subscriber server front end/network exposure function upon request from a client, for example, in order to allow the client to determine the location of the data storage function/home subscriber server front end/network exposure function to subscribe for the UE context information. In an embodiment, the providing step may also include providing the location of the serving network function (e.g., AMF).

According to an embodiment, when the UE is roaming, the providing step may further include providing, to the client, the address of the data storage function in the HPLMN and the address of the data storage function in the VPLMN. In certain embodiments, upon re-location of the UE(s), the method may also include, at 770, providing, to the client, a notification to subscribe to a new data storage function containing the UE context information.

Embodiments of the invention provide several technical improvements and/or advantages. For example, as a result of certain embodiments, a data storage discovery for data sharing use case is provided. In addition, certain embodiments provide a deterministic solution for the network function (consumer of the UE context) to find the data storage where the UE context is stored in order to subscribe for the same. Otherwise, the network function (consumer of the UE context) would have to query multiple layers to determine the correct one, thereby significantly impacting the performance of the system. Accordingly, the use of embodiments of the invention results in the improved functioning and performance of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In some embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:
1. A method, comprising:
   obtaining, from a network node, an address of a data storage function (DSF) or home subscriber server front end (HSS FE) or network exposure function (NEF) that contains user equipment context information for at least one user equipment; and accessing, by a client, the data storage function (DSF) or home subscriber server front end (HSS FE) or network exposure function (NEF) to register for the user equipment context information, wherein the obtaining comprises a consumer network function looking-up a network exposure function (NEF) to obtain serving data storage information where the user equipment context information resides.

2. The method according to claim 1, wherein the accessing comprises registering with the serving data storage for the user equipment context information.

3. The method according to claim 1, wherein the data storage function in a home public land mobile network uses the serving data storage information to register for the user equipment context information.

4. The method according to claim 1, wherein, when the at least one user equipment is roaming, the accessing comprises registering with the data storage function in a visited public land mobile network.

5. The method according to claim 1, further comprising, upon re-location of the at least one user equipment, a new data storage function obtains registration information of the client as a part of context transfer.

6. The method according to claim 1, wherein the client comprises a network function or data analytics function that is a consumer or producer of the user equipment context information.

7. The method according to claim 6, wherein the producer network function comprises at least one of a home subscriber server, home subscriber server front end, subscriber data management function, or service discovery function configured to store an address of the data storage function that contains the user equipment context information for the at least one user equipment.

8. An apparatus, comprising:
at least one processor; and
at least one memory including computer program code,
the at least one memory and the computer program code configured, with the at least one processor, to cause the apparatus at least to
obtain, from a network node, an address of a data storage function (DSF) or home subscriber server front end (HSS FE) or network exposure function (NEF) that contains user equipment context information for at least one user equipment;

access the data storage function (DSF) or home subscriber server front end (HSS FE) or network exposure function (NEF) to register for the user equipment context information; and look-up a home subscriber server (HSS) and/or front end (FE) to obtain serving data storage information where the user equipment context information resides.

9. The apparatus according to claim 8, wherein the at least one memory and the computer program code are further configured, with the at least one processor, to cause the apparatus at least to register with the serving data storage for the user equipment context information.

10. The apparatus according to claim 8, wherein the at least one memory and the computer program code are further configured, with the at least one processor, to cause the apparatus at least to register with the serving data storage via the front end for the user equipment context information.

11. The apparatus according to claim 8, wherein the data storage function in a home public land mobile network uses the serving data storage information to register for the user equipment context information.

12. The apparatus according to claim 8, wherein, when the at least one user equipment is roaming, the at least one memory and the computer program code are further configured, with the at least one processor, to cause the apparatus at least to register with the data storage function in a visited public land mobile network.

13. The apparatus according to claim 8, wherein, upon re-location of the at least one user equipment, a new data storage function obtains registration information of the client as a part of context transfer.

14. The apparatus according to claim 8, wherein the apparatus comprises a network function or data analytics function that is a consumer or producer of the user equipment context information.

15. The apparatus according to claim 14, wherein the producer network function comprises at least one of a home subscriber server, home subscriber server front end, subscriber data management function, or service discovery function configured to store an address of the data storage function that contains the user equipment context information for the at least one user equipment.

16. A computer program, embodied on a non-transitory computer readable medium, the computer program configured to control a processor to perform a method according to claim 1.

* * * * *